United States Patent [19]

Cutter et al.

[11] 4,170,626

[45] Oct. 9, 1979

[54] GAS DISTRIBUTION APPARATUS FOR USE WITH FLUIDIZED BEDS

[75] Inventors: Lois M. Cutter, Minneapolis, Minn.; John R. Crawford, Arlington Heights; Gregory J. Thompson, Waukegan, both of Ill.

[73] Assignee: UOP Inc., Des Plaines, Ill.

[21] Appl. No.: 922,461

[22] Filed: Jul. 6, 1978

[51] Int. Cl.[2] .............................................. B01J 8/00
[52] U.S. Cl. .................................. 422/143; 239/597; 422/311; 422/310
[58] Field of Search .............. 422/143, 139, 311, 310; 239/597, 601; 34/57 B, 241

[56] References Cited
U.S. PATENT DOCUMENTS

| 2,046,456 | 7/1936 | Johnson | 166/231 |
| 2,046,458 | 7/1936 | Johnson | 166/231 |
| 2,049,206 | 7/1936 | Johnson | 166/231 |

FOREIGN PATENT DOCUMENTS 544786 8/1957 Canada ...................................... 422/143

Primary Examiner—Joseph Scovronek
Assistant Examiner—Chris Konkol
Attorney, Agent, or Firm—James R. Hoatson, Jr.; Barry L. Clark; William H. Page, II

[57] ABSTRACT

Apparatus for distributing the flow of gas, usually air, in a fluidized bed includes a plurality of vertically upstanding distributor members extending upwardly from a manifold member to which they are threadedly engaged. The members are of closed end, generally tubular shape and have a helical slotted opening extending along their length. The width of the slotted openings is less than the diameter of the majority of particles utilized in the associated fluidized bed.

3 Claims, 3 Drawing Figures

GAS DISTRIBUTION APPARATUS FOR USE WITH FLUIDIZED BEDS

BACKGROUND OF THE INVENTION

This invention relates to fluidized beds and particularly to apparatus for distributing a fluidizing gas to the bed. A typical fluidized bed such as that utilized in a fluidized catalytic cracker unit for example contains a large quantity of relatively expensive catalyst particles which might range in size from about 20–150 microns. In order to minimize the quantity and cost of catalyst required to achieve a given result in a process operation the gas which is directed upwardly through the bed should contact all of the catalyst uniformly and should remain in contact with the catalyst for a maximum length of time. A catalyst unit can be very large, such as 10 meters in diameter. One common way of achieving gas distribution is such a unit is to form a perforated plate under the fluidized bed or a planar assembly of pipes in the bottom of the unit which have myriad branches and perforations therein through which gas is carried to the bed. The pipe type units are expensive while either type of unit is somewhat inefficient since the flow tends to channel upwardly through portions of the bed immediately above the perforations while by-passing other portions. Also, when the blowers which force the gas through the bed are shut down the bed slumps and many of the particles forming it tend to get sucked into the perforations by the back surge of gas which occurs at shutdown. The particles can damage the blowers and can also present problems when the blowers are restarted due to pressure required to force the particles back through the perforations. In addition, and of greater concern, the particles are usually very erosive and their continued contact with the perforations as they pass through them can quickly enlarge the openings. The enlargement will vary the pressure drop of the system and change the flow characteristics so as to affect the efficiency of contact of the catalyst and gas since it is important that a given pressure drop be maintained through the bed.

One type of flow distributor which is in use and intended to reduce backflow of catalyst has a threaded hollow base portion which is integral with an upper radially perforated portion having very large perforations (about 4.76 mm). The upper portion is covered by a conically topped cylinder which causes the gas exiting the perforations to be directed downwardly toward the base in a ring-shaped configuration. The downward flow helps insure maximum contact time with the catalyst since the flow reverses at the bottom of the bed and moves upwardly through the entire bed. However, the aforementioned flow distributors are very expensive. Also, the downward flow of gas tends to blow the erosive catalyst particles against whatever is under the distributor and quickly erode it. The damage can be reduced by placing large washers under the distributors which can be periodically replaced as they become worn.

SUMMARY

It is among the objects of the present invention to provide a gas distribution system for a fluidized bed which will provide uniform gas flow distribution and maximum contact time between the gas and the particles making up the bed. These and other objects of the invention are attained by the distribution system of the present invention wherein a plurality of generally tubular, vertically upstanding distributor members are threadedly mounted at spaced locations on the surface of a manifold means. The manifold means is preferably a large plate or series of plates with uniformly spaced threaded perforations but could also be made of pipes or tubes attached to each other in a planar array with upward facing threaded openings. The distributor members have solid, unperforated upper ends, threaded lower ends, and side walls defined by a wire helically wrapped around a plurality of longitudinal rods to which it is welded so as to define a very narrow and continuous helical slot-like opening having a width less than the maximum particle size. For example, a slot width of about 20–50μ is quite satisfactory when the sizes of the particles of the fluidized bed are in the range of about 20–150μ. The slotted portion of the distributor member is preferably formed in the manner taught in U.S. Pat. No. 2,046,458 to E. E. Johnson. A slot width of less than 20μ would, of course, insure that no particles in the range of 20–150μ could pass through the slot openings but such small openings could produce an excessive amount of pressure drop. In one typical fluidized bed unit, a pressure drop through the slot openings of 0.8 psi is desired when gas at 20–40 psi is present in the manifold means. The number and spacing of the distributor units is selected to achieve this desired pressure drop. Obviously, if the pressure drop through each unit is large, then only a few units can be used to achieve the desired overall pressure drop. Although spacing between units can vary between about 15–78 cm, the greater spacing provides less uniform flow distribution in the bed. Conversely, too little pressure drop through an individual unit would necessitate that a large number of units be used. This would make for very uniform flow distribution in the bed but would be costly in terms of the extra units and threaded manifold openings required.

DESCRIPTION OF THE PREFERRED EMBODIMENT

Figure 1:
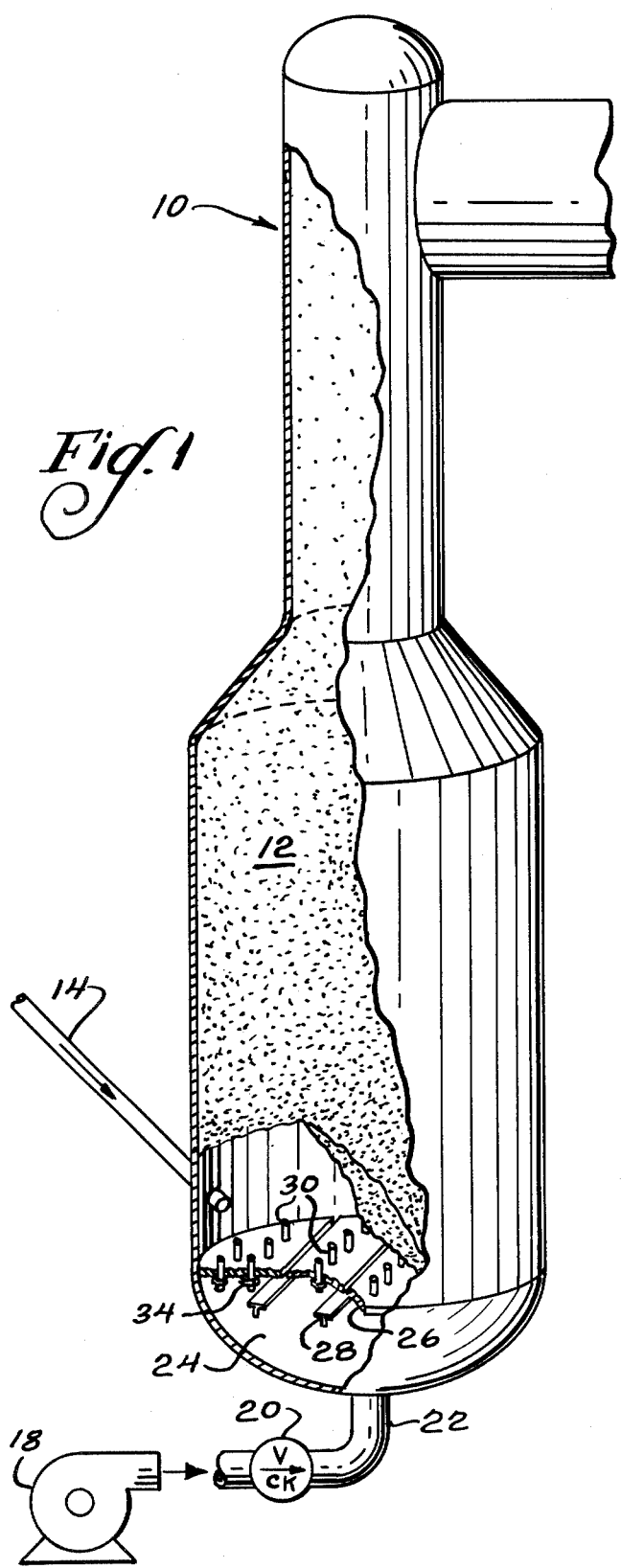
FIG. 1 is a perspective, partially broken away, view of a fluidized bed containing catalyst regenerator vessel in which the improved gas distribution apparatus is mounted.
Figure 2:
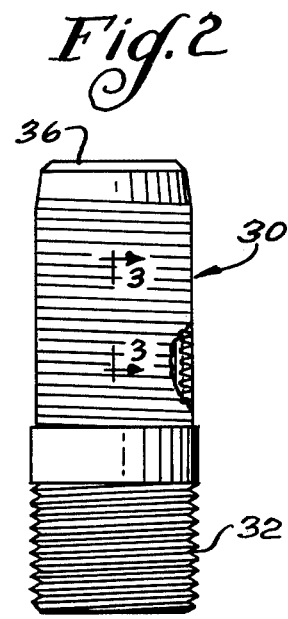
FIG. 2 is a side view, partly in section, of one of the improved flow distributor units.
Figure 3:
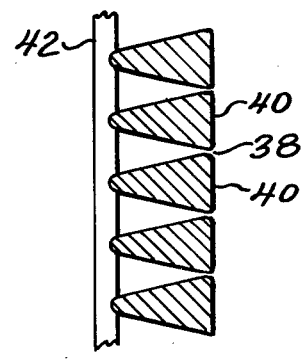
FIG. 3 is an enlarged section view taken on line 3—3 of FIG. 2.

Referring to FIG. 1, a reactor vessel 10 is shown as containing a fluidized catalyst bed 12. The unit is shown as corresponding in function to the catalyst regeneration unit of U.S. Pat. No. 3,953,175, the disclosure of which is incorporated by reference herein. Spent catalyst is delivered to the vessel 10 through inlet pipe 14 while pressurized air is forced by pump 18 through check valve 20 and pipe 22 into the manifold 24 defined by the bottom end of the vessel 10 and the bottom bed plates 26 which are supported on beams 28. Mounted at spaced intervals on the bed plates 26 are a plurality of identical hollow flow distribution members indicated generally at 30 which have threaded base portions 32 retained to the base plates 26 by nuts 34. The distribution members 30 are closed at their tops by an end plate 36 which prevents the catalyst 12 from entering the distributor when the blower 18 is shut down so as to cause the catalyst bed to slump. The members 30 include a helical slot 38 defined by the distance between wraps of a shaped helically wrapped wire 40 which is welded at a plurality of spaced points to a plurality of internal rod members 42. The helical wrap wire 40 is preferably made of a material such as stainless steel which is resistant to corrosion and erosion from the catalyst particles 12. The width of the slot 38 should be as constant as possible and preferably of a dimension of about 20–50μ for use with a catalyst bed 12 having particles sized from 20–150μ.

We claim as our invention:

1. Apparatus for uniformly distributing a gas to a fluidized bed having a particle size in the range of 20–150μ comprising gas supply manifold means mounted at the bottom of said bed, said manifold means having a plurality of flow distribution members threadedly engaged therewith and projecting generally vertically upwardly therefrom, each of said flow distribution members having a closed top portion and being of a generally tubular configuration, the walls of said members being defined over the major portion of their length by a continuous helical configured wire having a relatively flat outer surface and inwardly tapered converging side surfaces which are separated at their inner ends by a rounded inner surface which is welded at spaced points along its length to a plurality of inner longitudinal rod members to define a continuous helical slot having a width no greater than about 75μ, said slots serving to distribute gas from said manifold means horizontally through a fluidized bed in which said flow distribution members are mounted while preventing substantially all inward movement of the particles forming the bed through said slots when the outward flow of gas through said slots is terminated so as to produce a negative pressure within said distribution members.

2. The apparatus of claim 1 wherein the helical slot width does not exceed 50μ.

3. The apparatus of claim 1 wherein the helical slot width does not exceed 25μ.

* * * * *